(12) United States Patent
Simic et al.

(10) Patent No.: US 8,081,922 B2
(45) Date of Patent: Dec. 20, 2011

(54) METHODS AND APPARATUSES FOR PROCESSING SATELLITE POSITIONING SYSTEM SIGNALS

(75) Inventors: Emilija M. Simic, La Jolla, CA (US); Douglas Grover, San Diego, CA (US); Rizwan Ahmed, Alexandria, VA (US)

(73) Assignee: QUALCOMM Incorporated, San Diego, CA (US)

( * ) Notice: Subject to any disclaimer, the term of this patent is extended or adjusted under 35 U.S.C. 154(b) by 821 days.

(21) Appl. No.: 12/130,520

(22) Filed: May 30, 2008

(65) Prior Publication Data

US 2009/0295632 A1   Dec. 3, 2009

(51) Int. Cl.
*H04H 1/00* (2006.01)

(52) U.S. Cl. ...... 455/3.02; 455/12.1; 455/427; 455/423; 455/67.11; 375/148; 375/150

(58) Field of Classification Search ............. 455/3.02, 455/425, 427, 452.1, 452.2, 12.1, 13.2, 67.16, 455/67.11, 423; 375/150, 343, 148; 342/352, 342/357, 343, 357.01, 375.12, 357.69, 357.73, 342/357.58, 57.06

See application file for complete search history.

(56) References Cited

U.S. PATENT DOCUMENTS

| | | | |
|---|---|---|---|
| 6,311,043 B1 * | 10/2001 | Haardt et al. | 455/67.16 |
| 6,825,805 B2 | 11/2004 | Rowitch | |
| 6,965,760 B1 * | 11/2005 | Chen et al. | 455/226.1 |
| 7,180,446 B2 * | 2/2007 | Wang et al. | 342/357.69 |
| 2004/0078140 A1 * | 4/2004 | Rowitch et al. | 701/213 |
| 2006/0222058 A1 | 10/2006 | Simic et al. | |
| 2007/0242734 A1 * | 10/2007 | Gaynor et al. | 375/150 |
| 2007/0242776 A1 | 10/2007 | Chuang et al. | |
| 2008/0079633 A1 * | 4/2008 | Pon et al. | 342/357.12 |

FOREIGN PATENT DOCUMENTS

| | | |
|---|---|---|
| EP | 1783511 A2 | 9/2007 |
| WO | WO2006049963 | 5/2006 |

OTHER PUBLICATIONS

International Search Report & Written Opinion-PCT/US2009/045030, International Search Authority—European Patent Office—Aug. 18, 2009.

* cited by examiner

*Primary Examiner* — Tan Trinh
(74) *Attorney, Agent, or Firm* — Linda G. Gunderson

(57) ABSTRACT

Methods and apparatus are provided for use in devices adapted to receive signals from at least one satellite positioning system (SPS). As part of at least one search for a transmission from a space vehicle (SV) associated with the SPS, the methods and apparatuses may correlate a code associated with the SV with a received signal to establish a plurality of correlation values, sample at least a portion of the correlation values during the search, and selectively transitioning the search early or prematurely based, at least in part, on at least one of the sampled correlation values.

92 Claims, 6 Drawing Sheets

METHODS AND APPARATUSES FOR PROCESSING SATELLITE POSITIONING SYSTEM SIGNALS

FIELD

The subject matter disclosed herein relates to electronic devices, and more particularly to methods and apparatuses for use in devices adapted to process satellite positioning system (SPS) signals and/or other like signals.

BACKGROUND

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity between a plethora of devices, both fixed and portable. Many of these wireless systems are coupled together through other communication systems and resources to promote even more communication and sharing of information. Indeed, it is not uncommon for some devices to be adapted to communicate with more than one wireless communication system and this trend appears to be growing.

Another popular and increasingly important wireless technology includes navigation systems and in particular satellite positioning systems (SPS) such as, for example, the global positioning system (GPS) and other like Global Navigation Satellite Systems (GNSS). An SPS receiver path, for example, may receive wireless SPS signals that are transmitted by a plurality of orbiting satellites of a GNSS. The SPS signals once received may be processed, for example, to determine a global time, an approximate geographical location, altitude, and/or speed associated with a device having the SPS receiver path.

SUMMARY

Methods and apparatuses are provided for use in devices adapted to receive signals from at least one satellite positioning system (SPS). As part of at least one search for a transmission from a space vehicle (SV) associated with the SPS, the methods and apparatuses may correlate a code associated with the SV with a received signal to establish a plurality of correlation values, sample at least a portion of the correlation values during the search, and selectively transitioning the search early or prematurely based, at least in part, on at least one of the sampled correlation values.

In accordance with certain aspects a method may include, for example, correlating a code associated with said SV with a received signal to establish a plurality of correlation values, sampling at least a portion of said correlation values during said search, and selectively transitioning said search early or prematurely based, at least in part, on at least one of said sampled correlation values. In certain implementations, such a method may include identifying intermediate valid peaks during said search until an early peak is detected and/or a maximum integration time is reached. In certain implementations, such a method may include subtracting energy measurement(s) surrounding at least one intermediate peak from subsequent cells, regions, and/or grids to provide at least one uncorrelated measurement value. In certain implementations, such a method may include identifying a correction for an earlier correlation value if an earlier peak is identified.

In certain implementations, such a method may include identifying said at least one of said sampled correlation values as a peak candidate associated with said transmission from said SV. In certain implementations, such a method may include selectively transitioning said search based, at least in part, on at least two of said sampled correlation values and identifying each of said at least two of said sample correlation values as peak candidates associated with said transmission from said SV. Here, for example, a first one of said at least two of said sampled correlation values is identified as a best max peak (BMP) candidate and a second one of said at least two of said sampled correlation values is identified as a best early peak (BEP) candidate or a best other peak (BOP) candidate.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Overview

Figure 1:
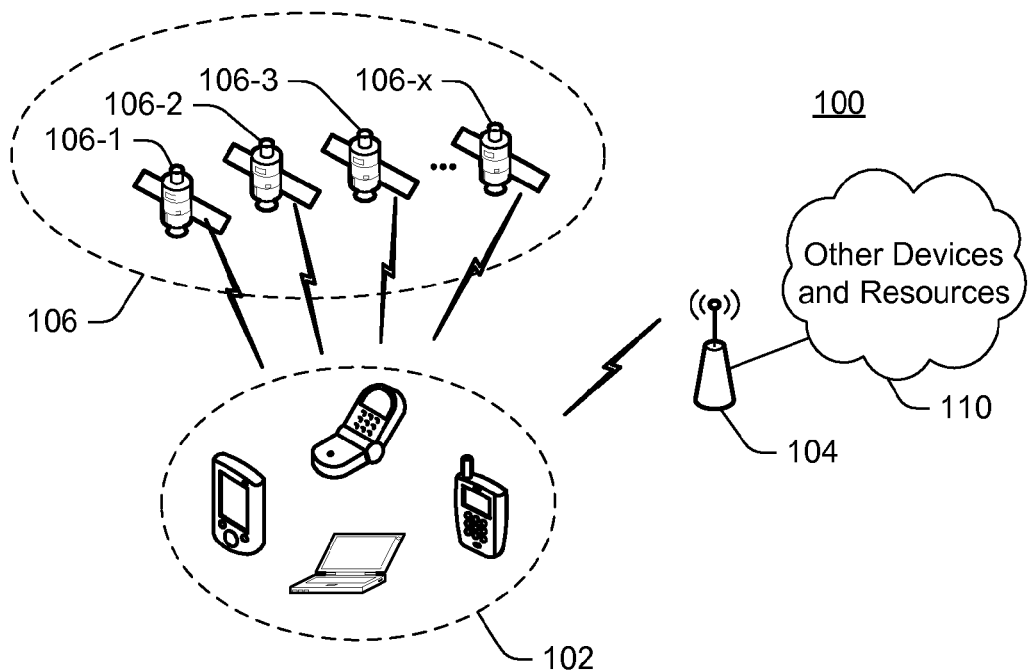
FIG. 1 is diagram illustrating an exemplary environment that includes a device with at least one satellite positioning system (SPS) interface for receiving and processing SPS signals in a dynamic integration mode in accordance with an implementation.

Methods and apparatus are provided for use in devices adapted to receive signals from at least one transmitter associated with a satellite positioning system (SPS). The methods and apparatuses may allow the device to sample at least a portion of correlation values which are determined during a search for a signal and to selectively "transition" the search in some manner early or prematurely if possible based, at least in part, on the sampled correlation values. For example, a search may be transitioned by terminating (e.g., ending, resetting, etc.) it early or prematurely, flagging it for early or premature termination and/or initiating another type of search if an applicable candidate peak is detected using the sampled correlation values during a search period or dwell time rather than waiting for such a period or time to end or pass. Consequently, in certain situations, an exemplary device adapted in accordance with the techniques provided herein may operate more efficiently while searching for signals.

Reference throughout this specification to "one example", "an example" or "certain examples" means that a particular feature, structure, or characteristic described in connection with the feature and/or example is included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

An SPS may include a system of transmitters positioned to enable entities to determine their location on the Earth based, at least in part, on signals received from the transmitters. Such a transmitter may transmit a signal marked with a repeating pseudo-random noise (PN) code of a set number of chips and may be located on ground based control stations, user equipment and/or space vehicles.

A "space vehicle" (SV) as referred to herein relates to an object that is capable of transmitting signals to receivers on the Earth's surface. In one particular example, such an SV may include a geostationary satellite. Alternatively, an SV may include a satellite traveling in an orbit and moving relative to a stationary position on the Earth. However, these are merely examples of SVs and claimed subject matter is not limited in these respects.

In a particular example, such transmitters may be located on SVs such as Earth orbiting satellites. For example, a satellite in a constellation of a Global Navigation Satellite System (GNSS) such as Global Positioning System (GPS), Galileo, Glonass or Compass may transmit a signal marked with a PN code that is distinguishable from PN codes transmitted by other satellites in the constellation.

To estimate a location at a receiver, a navigation system may determine pseudorange measurements to SVs "in view" of the receiver using well known techniques based, at least in part, on detections of PN codes in signals received from the SVs. Such a pseudorange to an SV may be determined based, at least in part, on a code phase detected in a received signal marked with a PN code associated with the SV during a process of acquiring the received signal at a receiver. To acquire the received signal, a navigation system may correlate a received signal with a locally generated PN code associated with an SV. For example, such a navigation system may correlate such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Upon detection of a code phase of a signal received from a GNSS SV, a receiver may form multiple pseudorange hypotheses. Using additional information, a receiver may eliminate such pseudorange hypotheses to, in effect, reduce an ambiguity associated with a true pseudorange measurement. With sufficient accuracy in knowledge of timing of a signal received from a GNSS SV, some or all false pseudorange hypotheses may be eliminated.

In certain situations, it may be important for a device to search for and locate SV transmitted signals in an efficient manner. For example, if time may be limited it may be beneficial to have a device that quickly identifies SV signals. For example, if processing resources and/or a power supply is limited it may be beneficial to have a device that quickly identifies SV signals.

FIG. 1 is a block diagram illustrating a wireless environment 100 that may include various computing and communication resources adapted to provide at least some form of navigation services in accordance with certain exemplary implementations of present description. Here, for example, an SPS 106 may include a plurality of SVs 106-1, 106-2, 106-3, . . . , 106-x that may transmit SPS signals to a device 102.

Device 102 may, for example, include a mobile device or a device that while movable is primarily intended to remain stationary. Thus, as used herein, the terms "device", "mobile device", "mobile station" (MS), may be used interchangeable as each term is intended to refer to any single device or any combinable group of devices that may transmit and/or receive wireless signals.

By way of example but not limitation, as illustrated using icons in FIG. 1, device 102 may include a mobile device such as a cellular phone, a smart phone, a personal digital assistant, a portable computing device, a navigation unit, and/or the like or any combination thereof. In other exemplary implementations, device 102 may take the form of a machine that is mobile or stationary. In still other exemplary implementations, device 102 may take the form of one or more integrated circuits, circuit boards, and/or the like that may be operatively adapted for use in another device.

In certain implementations wireless environment 100 may further include various computing and communication resources adapted to provide communication and/or other information processing services with respect to device 102. Thus, for example, wireless environment 100 may be representative of any system(s) or a portion thereof that may include at least one device 102 adapted to transmit and/or receive wireless signals to/from at least one wireless communication system 104.

As illustrated in FIG. 1, wireless communication system 104 may be adapted to communicate with and/or otherwise operatively access other devices and/or resources as represented simply by cloud 110. For example, cloud 110 may include one or more communication devices, systems, networks, or services, and/or one or more computing devices, systems, networks, or services, and/or the like or any combination thereof.

Device 102 may, for example, be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

Device 102 may receive transmissions from SVs 106-1, 106-2, 106-3, . . . , 106-x in the line of sight (LOS) to device 102, and derive time measurements from four or more of the transmissions.

Device 102 may search for a transmission from a particular SV by correlating the PN code for the SV with a received signal. The received signal typically includes a composite of transmissions from one or more SVs within a line of sight to a receiver at device 102 in the presence of noise. A correlation may be performed over a range of code phase hypotheses known as the code phase search window $W_{CP}$, and over a range of Doppler frequency hypotheses known as the Doppler search window $W_{DOPP}$. As pointed out above, such code phase hypotheses are typically represented as a range of PN code shifts. Also, Doppler frequency hypotheses are typically represented as Doppler frequency bins.

Figure 4:
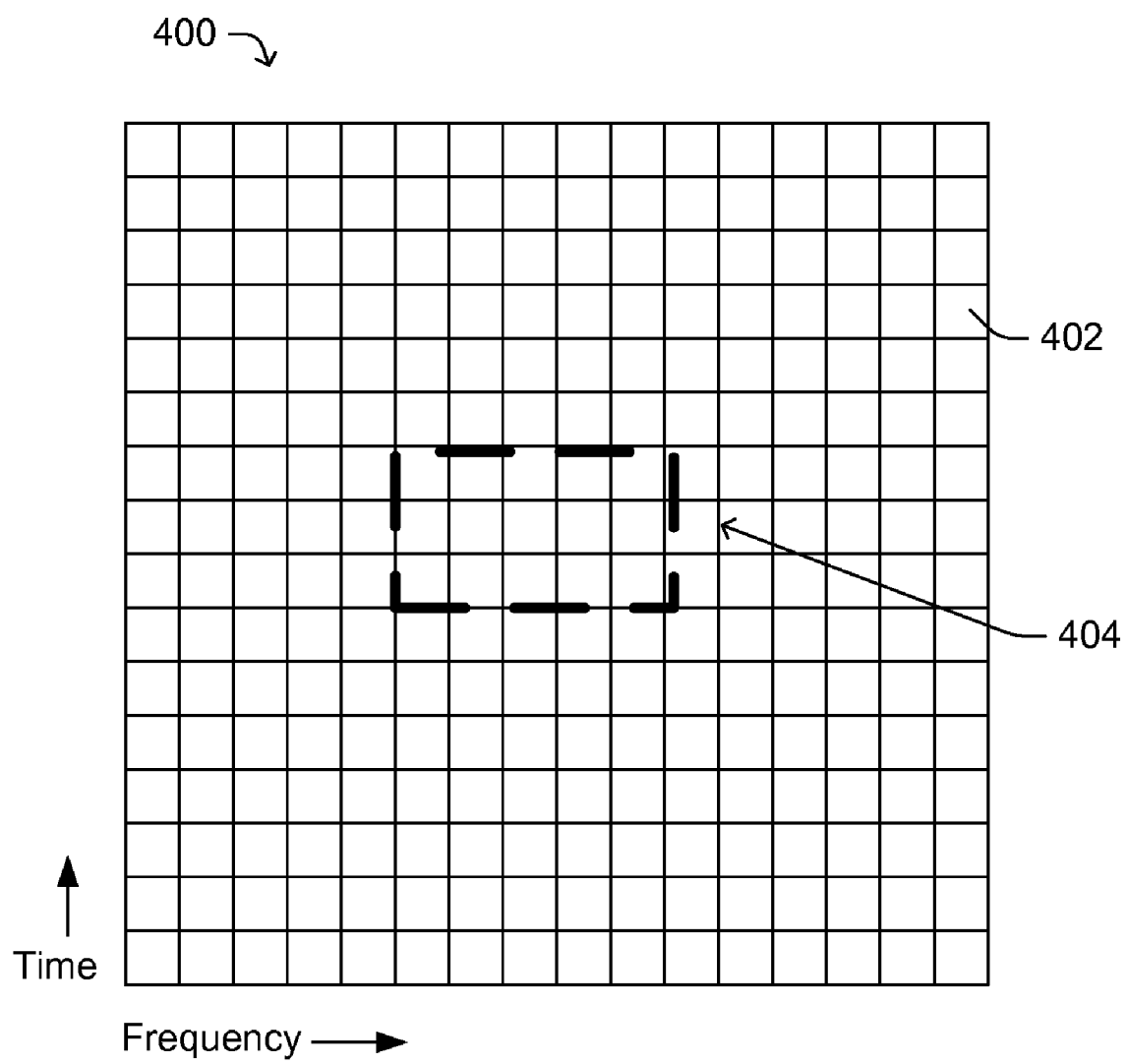
FIG. 4 and FIGS. 5A and 5B are illustrative diagrams showing grids depicting an exemplary search space having a plurality of cells or bins.

By way of example, FIG. 4 illustrates an exemplary search window presents as a virtual grid 400 having a plurality of cells 402. Also illustrated is a region 404 of grid 400 that is associated with a subset of cells 402 therein. As described in greater detail in subsequent sections, in certain implementations one or more threshold values that may be associated with grid 400 may be different for one or more regions therein.

A correlation may be performed over an integration time "T" which may be expressed as the product of $N_c$ and M, where $N_c$ is the coherent integration time, and M is the number of coherent integrations which are non-coherently combined. For a particular PN code, correlation values may be associated with corresponding PN code shifts and Doppler bins to define a two-dimensional correlation function. Peaks of the correlation function may, for example, be identified and compared to a predetermined noise threshold. The threshold may, for example, be selected so that the false alarm probability, the probability of falsely detecting an SV transmission, is at or below a predetermined value. A time measurement for the SV may be derived from a location of an earliest non-side lobe peak along the code phase dimension which equals or exceeds the threshold. A Doppler measurement for the subscriber station may be derived from the location of the earliest non-side lobe peak along the Doppler frequency dimension which equals or exceeds the threshold.

Techniques described herein may be used with any one of several SPS' and/or combinations of SPS'. Furthermore, such techniques may be used with positioning determination systems that utilize pseudolites or a combination of SVs and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with system time. Such a transmitter may be assigned a unique PN code so as to permit identification by a remote receiver. Pseudolites may be useful in situations where GPS signals from an orbiting SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals" and/or "SV signals", as used herein, is intended to include SPS-like signals from pseudolites or equivalents of pseudolites.

With this in mind and in accordance with certain aspects, some exemplary methods and apparatuses will now be described, which may be implemented in one or more devices, such as device 102, to allow for a dynamic integration mode when searching for SPS signals. For example, device 102 may be adapted to search for a transmission from an SV 106-1 by correlating a code for the SV with a received signal to establish a plurality of correlation values. Device 102 may then sample at least a portion of the correlation values during the search and selectively transition the search in some manner based, at least in part, on at least one of the sampled correlation values. Such a transition may therefore occur at an "early" or "premature" stage of a search, for example, prior to a defined search period, dwell time, and/or the like.

Thus, for example, if operating in such a dynamic integration mode, device 102 may be adapted to terminate or flag for termination a search as soon as a peak candidate is identified, as any additional integration beyond this point may not necessarily benefit the quality of such a measurement. To further ensure a certain level of success in identifying such a valid peak at a potentially early or premature stage of a search, device 102 may also be adapted to perform certain tasks to increase the level of confidence that an identified peak candidate may be valid rather than being associated with a jammer or other interference, signal cross-correlation, a multipath component of the signal, and/or the like.

This aspect and others are described in greater detail sections below and through additional examples as provided in the section titled "Dynamic Integration Logic". However, these are merely some implementation examples associated with a dynamic integration mode and claimed subject matter is not limited in these respects.

The methods and apparatuses may support a variety of different types of searches. By way of example but not limitation, such searches may include one or more acquisition searches, verification searches, tracking searches, or the like.

In an example, a search may include an acquisition search and device 102 may be adapted to selectively transition the search by initiating a verification search based, at least in part, on at least one of the sampled correlation values. In another example, the search may include an acquisition search and/or a verification search. Here, device 102 may, for example, be adapted to selectively transition the search by initiating a tracking search based, at least in part, on at least one of the sampled correlation values.

In certain implementations, correlation values established by device 102 may include integrated correlation values. In certain implementations, for example, the correlation values may be associated with a range of code phase hypotheses and a range of Doppler frequency hypotheses. Thus, for example, device 102 may be adapted to sample at least a portion of the integrated correlation values early or prematurely during a search rather than waiting for a defined search or dwell time to pass. For example, device 102 may periodically sample such values while the search is occurring (e.g., twice a second, once a second, etc.). In accordance with certain example implementations, during a search, device 102 may be adapted to process intermediate search results (e.g., using parameters appropriate for the search up to that point) and selectively transition (e.g., exit) the search early or prematurely if certain criteria are met. Thus, the resulting dwell times may vary as a search may transition at any multiple of a search sampling period. It should be understood, however, that this is merely one example implementation and that claimed subject matter is not limited to this particular implementation. In accordance with another example implantation, selective transition of the search early or prematurely may, if certain criteria are met, may include flagging the search for early termination, and/or initiating another type of the search.

Device 102 may be adapted to determine that at least one of the sampled correlation values represents a peak candidate associated with the transmission from the SV based, at least in part, on at least one peak threshold value. In certain implementations, a peak threshold value may be dynamically determined, for example, a device may adapt at least one peak threshold value based, at least on part, on at least one correlation value associated with a previous search, and/or at least one previously sampled correlation value. A peak threshold value may, for example, be equal to or greater than one or more of a noise threshold value, a jammer threshold value, and/or other like threshold values.

In certain example implementations, a peak threshold may be based, at least in part, on at least one pad value and a noise threshold value, a jammer threshold value, and/or other like threshold values. For example, a pad value may be added to one or more of a noise threshold value, a jammer threshold value, and/or other like threshold value to establish a peak threshold value. The pad value may, for example, be based, at least in part, on a type or types of search or searches being conducted. For example, if at least one search includes an acquisition search then the pad value may be set to a "lower" pad value, which in certain implementations may be 0 dB or close to 0 dB.

In another example, if at least one search includes an acquisition search with a subsequent verification search then the pad value may be set to a lower pad value. Conversely, in certain implementations, if at least one search includes an acquisition search without a subsequent verification search then the pad value may be set to a "higher" pad value, which may, for example, be greater than 0 dB (e.g., 3 dB, 6 db., or higher or lower). In other example implementations, if at least one search includes a verification search then the pad value may be set to a higher pad value. In still other examples, if at least one search includes a tracking search then the pad value may be set to a higher pad value if a search time associated with the tracking search has not exceeded a time threshold, otherwise the pad value may be set to a lower pad value. For example, in certain implementations, a time threshold may be established as two seconds. However, it should be understood that this is merely one example implementation and that claimed subject matter is not limited to this particular implementation.

In still other example implementations, if at least one search includes a tracking search associated with at least one earlier selectively terminated search then a pad value may be set to a higher pad value. If at least one search includes a tracking search associated with at least one earlier tracking search then the pad value may be set to a lower pad value most of the time and higher pad value periodically, for example.

A peak threshold value may, for example, be based, at least in part, on the type of search being conducted. In certain implementations, device 102 may be adapted to dynamically establish at least one peak threshold value based, at least on part, on at least one correlation value associated with a previous search.

In certain example implementations, device 102 may be adapted to selectively transition the search based, at least in part, on at least one of the sampled correlation values by comparing the sampled correlation value with at least one corresponding previously sampled correlation value. For example, device 102 may compare one or more sampled correlation values with one or more corresponding previously sampled correlation values as part of a cross-correlation test.

In certain example implementations, device 102 may be adapted to determine that at least one corresponding previously sampled correlation value may be a peak candidate associated with the transmission from the SV based, at least in part, on at least one corresponding previously sampled correlation value being greater than at least one of the sampled correlation values.

In certain implementations, device 102 may be adapted to selectively transition the search based, at least in part, on at least one of the sampled correlation values by identifying at least one of the sampled correlation values as a peak candidate associated with the transmission from the SV. In one example, device 102 may be adapted to selectively transition the search based, at least in part, on at least two of the sampled correlation values and identifying such sample correlation values as peak candidates associated with the transmission from the SV. For example, in certain implementations, a first one of the sampled correlation values may be identified as a best max peak (BMP) candidate and a second one of the sampled correlation values may be identified as a best early peak (BEP) candidate or a best other peak (BOP) candidate. Additional details and examples are provided in subsequent sections, such as the sections titled "Multiple Peak Candidate Reporting" and "Dynamic Integration Logic". It should be understood, however, that these merely present some example implementations and that claimed subject matter is not intended to be limited to any specific implementation.

In certain implementations, device 102 may be adapted to establish at least two different noise threshold values, at least two different jammer threshold values, and/or at least two other like threshold values that may be considered in evaluating at least two of the correlation values. For example, device 102 may be adapted to establish at least one of a "reduced" noise threshold value, a "reduced" jammer threshold value, and/or another like "reduced" threshold value for a subset or subsets of cell within a virtual grid region based, at least on part, on at least one of the sampled correlation values. Here, for example, such a subset may include one or more cells within a virtual grid region and/or the like based, at least on part, on at least one of correlation value associated with a previous search.

Additional details and examples are provided in subsequent sections, such as the sections titled "Multiple Threshold Values", "Dynamic Integration Logic" and "Dynamic threshold Values". It should be understood, however, that these merely present some example implementations and that claimed subject matter is not intended to be limited to any specific implementation.

In certain implementations, device 102 may be adapted to store at least one of correlation value associated with at least one previous search. For example, memory may be provided for storing such values and/or other like data/information and/or instructions.

In certain implementations, device 102 may be adapted to selectively "transition" at least one search by selectively terminating the search. In certain implementations, such a transition may include terminating a search early or prematurely rather than continuing the search for a defined period of time, etc. (e.g., waiting for a search to complete or time-out). In certain other implementations, a device may be adapted to selectively transition at least one search by selectively transitioning the search from a first type of search to a second type of search. For example, some devices may be adapted to selectively transition at least one search from an acquisition search to a verify search.

The methods and apparatuses provided herein may be adapted for use with one or more SVs associated with one or more SPS and as such the transmission from the SV may include an SPS signal. For example, such an SPS may include at least one GNSS.

Figure 2:
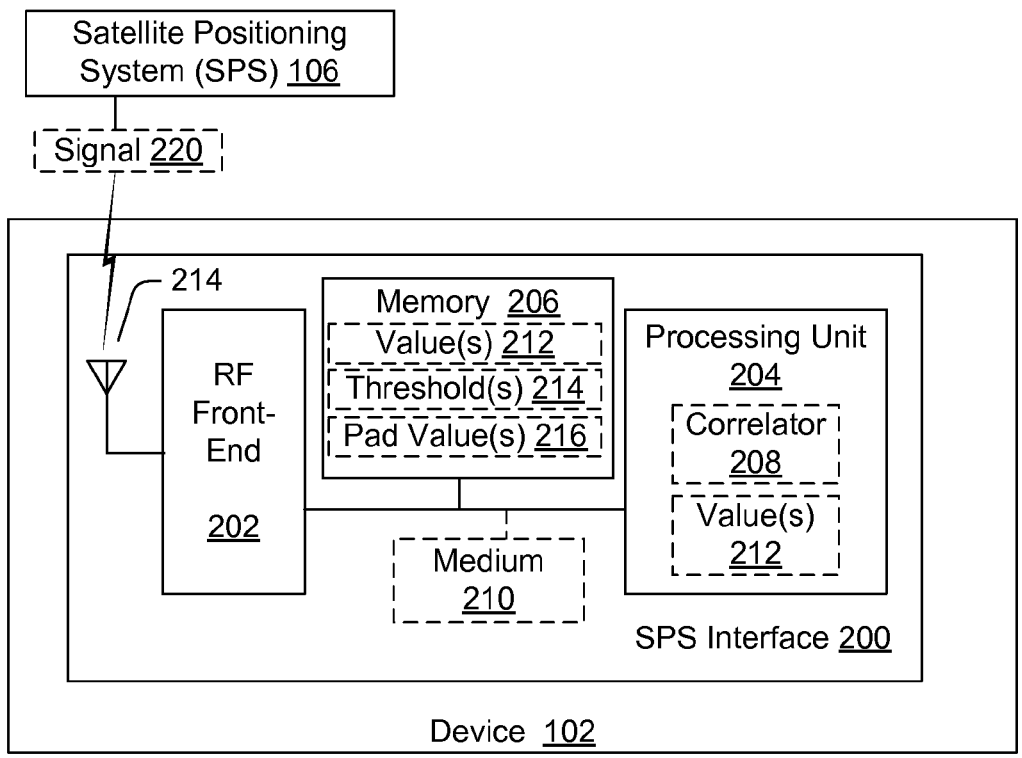
FIG. 2 is block diagram illustrating certain features of an exemplary device having an SPS interface that may, for example, be implemented in the environment of FIG. 1.

As illustrated in the exemplary block diagram of FIG. 2, in certain example implementations, device 102 may include an SPS interface 200 having at least one front-end radio 202 that may be adapted to receive the transmission of an SPS signal 220 associated with an SV of SPS 106 and generate a corresponding digital signal based thereon. SPS interface 200 may also include, for example, at least one processing unit 204 or the like that may be adapted to access the digital signal as part of at least one search for the transmission from the SV, correlate a code for the SV with a received signal to establish a plurality of correlation values, sample at least a portion of the correlation values during the search, and selectively transition the search based, at least in part, on at least one of the sampled correlation values. In certain implementations, for example, such a device may also include memory 206 that may be coupled to processing unit(s) 204 and adapted to store at least one of correlation value associated with at least one previous search. As illustrated in FIG. 2 processing unit 204 may include or otherwise be operatively associated with at least one correlator 208.

As illustrated in FIG. 2 a computer readable medium 210 may be provided and accessed by processing unit 204, for example. As such, in certain example implementations, the methods and/or apparatuses may take the form in whole or part of a computer readable medium 210 that may include computer implementable instructions stored thereon, which if executed by at least one processing unit or other like circuitry are adapted to enable the processing unit(s) 204 or the other like circuitry to correlate a code for the SV with a received signal to establish a plurality of correlation values as part of at least one search for a transmission from an SV, sample at least a portion of the correlation values during the search, and selectively transition the search based, at least in part, on at least one of the sampled correlation values.

Correlator 208 may be adapted to produce correlation values 212 from digital signals generated by RF front-end 202 and provided to the correlator and/or processing unit directly and/or through memory 206. Correlator 208 may be implemented in hardware, software, or a combination of hardware and software. However, these are merely examples of how a correlator may be implemented according to particular aspects and claimed subject matter is not limited in these respects.

As illustrated correlation values 212, one or more threshold values 214, and/or one or more pad values 216 may be stored in memory 206. As described in more detail in this detailed description, such values may be accessed and used by processing unit 204 if needed.

Processing unit 204 may, for example, be adapted to estimate a location of device 102 based, at least in part, on signals received from SVs as described herein.

The example implementations presented herein may therefore be adapted for use in systems for estimating a location based, at least in part, on pseudorange measurements, and wherein determining quantitative assessments of such pseudorange measurements may allow for a system to transition from a search process early or prematurely in a manner that may actually improve the accuracy of such pseudorange measurements and/or certain other aspects relating to system performance. However, it is noted that the claimed subject matter is not intended to be limited to such example implementations.

Figure 3:
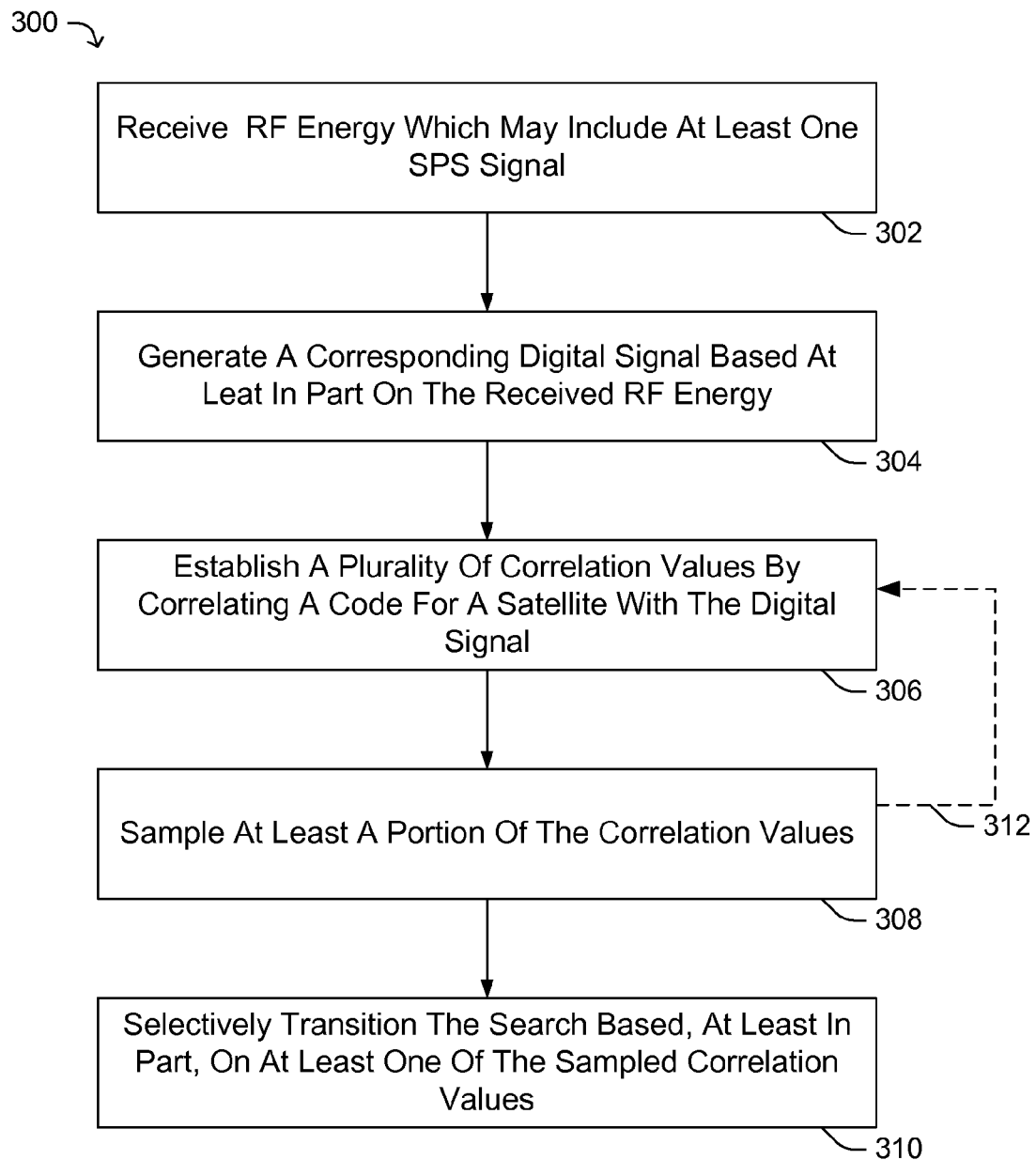
FIG. 3 is a flow diagram illustrating a method that may, for example, be implemented in the environment of FIG. 1 to provide a dynamic integration mode.

Attention is now drawn to FIG. 3, which is a flow diagram illustrating a dynamic integration search method 300 that may be implemented in device 102. At block 302, RF energy may be received, for example using RF front-end 202 and at least one antenna 214 (FIG. 2). The RF energy may include at least one SPS signal, such as, for example, SPS signal 220 (FIG. 2). Techniques for receiving such RF energy are well known.

At block 304, a corresponding digital signal may be generated based at least in part on at least a portion of the received RF energy. For example, RF front-end 202 (FIG. 2) may be adapted to sample the an analog signal associated with the received RF energy and convert such to the digital signal using one or more converters (not shown). Such digital signal may include energy measurement(s). Such sampling and analog to digital conversion techniques are well known.

At block 306, a plurality of correlation values may be established, for example, based at least in part on correlating a code for an SV with the digital signal generated at block 304. Such correlation techniques are well known.

At block 308, at least a portion of the correlation values may be sampled. As illustrated by arrow 312, method 300 may return to block 306, for example, to allow subsequent correlation values to be established.

At block 310, at least one dynamic integration period may be established by selectively transitioning the search in some manner based, at least in part, on at least one of the sampled correlation values.

Peak Processing Logic and Dynamic Integration Modes Examples

Device 102 may be adapted to use dynamic integration lengths in certain searches. For example, dynamic integration may be used in acquisition, verification and/or tracking searches. Such searches may, for example, be intended to be fixed time searches, which may instead be transitioned in some manner prematurely based, for example, on identifying the presence of at least one peak candidate.

This section provides some exemplary algorithms on how such searches may be conducted by device 102. Specifically, certain exemplary logic and/or threshold values are described which may, for example, allow certain performance goals to be met by device 102, such as optimizing measurement integration/fix times and/or measurement quality, providing an early path, autocorrelation/time side-lobe spur, frequency side lobe detection, and/or cross-correlation detection. Such exemplary algorithms may be provided along with or instead of fixed mode/length peak processing modes.

Multiple Peak Candidate Reporting

As mentioned in the Overview section above, device 102 may be adapted to identify one or more peak candidates. For example, in certain implementations, logic may be provided such that processing unit 204 (FIG. 2) identifies and reports or otherwise provides at least two peak candidates for further processing upon transitioning a search.

By way of example, a first of these peak candidates may include a best max peak (BMP), while a second peak candidate may include either a best early peak (BEP), or in case that no BEP has been identified, a best other peak (BOP). If only one peak candidate is identified, for example, a BMP alone, then such peak candidate may be reported.

In certain implementations, multiple peak candidate reporting may allow for: (i) reporting of an earliest valid path (BEP) if it exists; (ii) reporting a best maximum valid peak (BMP) in case a BEP appears to be related to cross-correlation; and/or (iii) reporting an alternate weaker valid peak, BOP, if it appears to exist in case such a BMP turns out to be related to cross-correlation.

Figure 5A:
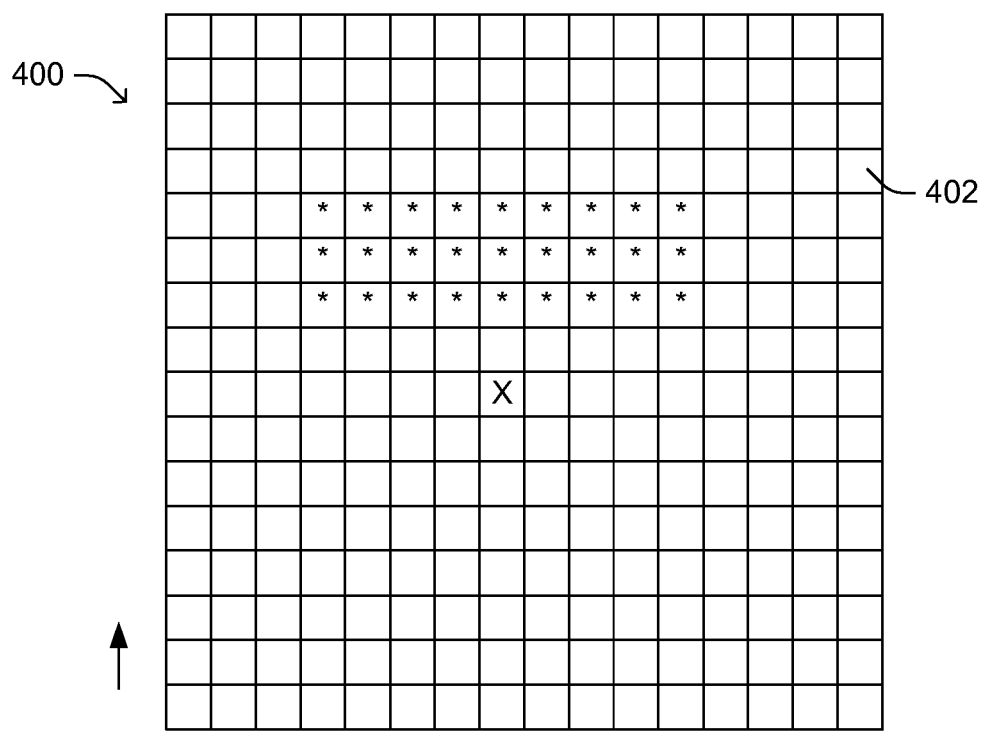
Figure 5B:
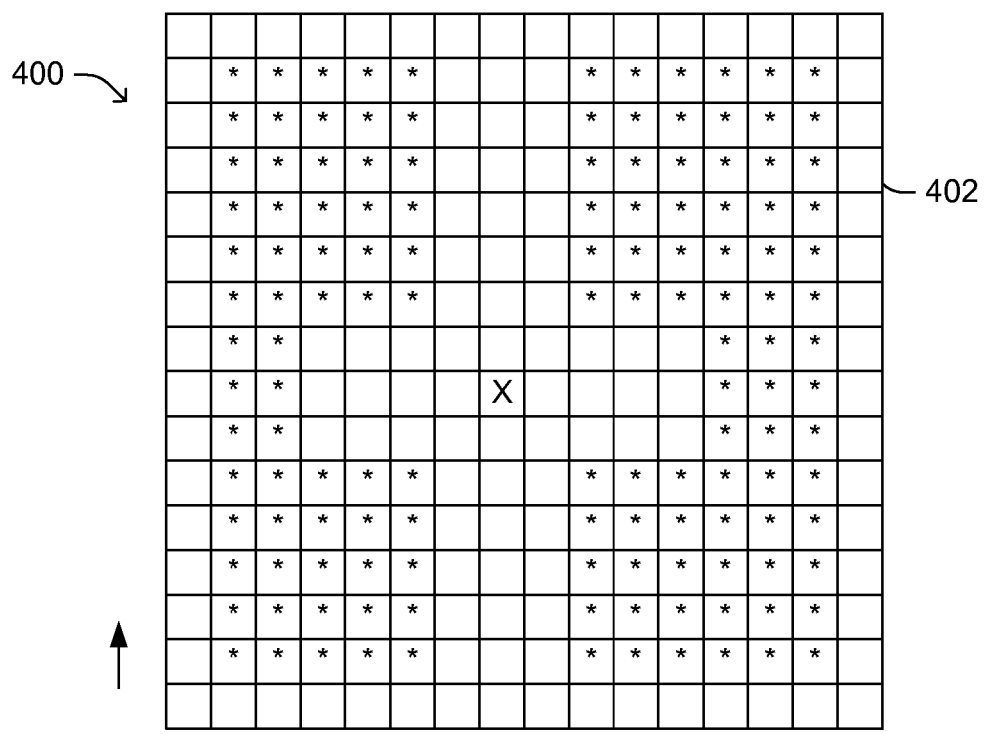

In certain implementations, a BOP may be the next strongest valid peak that does not appear to be related to a jammer and/or an artifact of a BMP (e.g., a frequency side lobe, an autocorrelation/time side-lobe spur, a later path, and/or the like). By way of example, to better ensure that frequency side lobes may be excluded, any peaks within one chip of the BMP and/or four Doppler bins may be excluded from consideration. By way of example, autocorrelation/time side-lobe spurs and/or multipath components may be better excluded by disregarding the BMP bin and certain neighboring bins (e.g., adjacent and/or other local bins). For example, see FIGS. 5A and 5B, which illustrate a grid 400 with cells or bins marked with an "*" to illustrate an allowable region for a BEP (FIG. 5A) and BOP (FIG. 5B). Here, the BMP is the cell or bin marked with an "X" in each Figure.

In certain implementations, therefore, device 102 may be adapted per BMP selection logic that may be designed to identify a strongest valid peak that does not appear to be related to a jammer.

In certain implementations, therefore, device 102 may be adapted per BEP selection logic that may be designed to identify an earliest valid peak that does not appear to be related to a jammer, appears to be within 6 dB of a BMP, and appears within an allowable region around BMP (e.g., 4 chips earlier and/or within +/−4 freq. bins around a BMP). Here, for example, should a tie in code phase dimension appear, such tie(s) may be broken by picking the strongest peak.

In certain implementations, therefore, device 102 may be adapted per BOP selection logic that may be designed to identify the strongest valid peak that does not appear to be related to a jammer, is not within a region around the BMP (e.g., within +/−1 freq. bin around the BMP or within +/−1 code phase hypothesis and +/−4 freq. bins around the BMP).

Those skilled in the art will recognize that such multiple peak candidate reporting logic may be implemented in a variety of different ways. By way of example but not limitation, pseudocode is provided below that may be adapted for use in device 102:

```
/* ABBREVIATIONS: BMP - Best Max Peak, BP - Best Peak */
// BMP Selection Code
for each Doppler bin
{
 /* Reject Frequency Bins flagged as noise or Jammer */
 count the number of hypothesis above noise threshold;
 if (number of peaks = 0) { mark bin as NOISE_BIN; }
 elseif(number of peaks > MAX){ mark bin as JAMMMER_BIN; }
 else {add info about the surviving bins and its peaks to
  POSSIBLE_BMP_ARRAY;
 }
}
sort the POSSIBLE_BMP_ARRAY by max peak energy in each bin;
for (j=0; j < size of POSSIBLE_BMP_ARRAY; j++)
{
/* Compute the Noise sum so the Jammer Ratio Test can be performed */
 compute noise sum for POSSIBLE_BMP_ARRAY[j].bin excluding
hypothesis that are
 1. Peaks (e.g., above noise threshold)
 2. Cells in the (e.g., 3×3) neighborhood of a Peak
 3. Not possible autocorrs, i.e.
  (peak > (POSSIBLE_BMP_ARRAY[j].energy >>
SIDELOBE_THRESH_SHIFT) +
   PRED_BKGND_NOISE_INT);
if (jammer_ratio_test passes)
 {
  mark POSSIBLE_BMP_ARRAY[j] as BMP and BEP;
  break;  // all other Possible BMPs may be weaker in energy because
   array is sorted
 }
}
// BEP Selection Code
/* Look for Earlier Paths if the maximum energy is below an empirical
threshold corresponding to paths that are assumed to be line of sight
(LOS). For these paths, assume that there is no early-path. */
if (BMP energy < linear equivalent of 33.5 dB-Hz)
{
early_peak_eng_threshold = BEP.energy >>
EARLYPEAK_THRESH_SHIFT +
   PRED_BKGND_NOISE_INT;
/* Now iterate through rest of POSSIBLE_BMP_ARRAY starting with
the current BMP */
for (; j < size of POSSIBLE_BMP_ARRAY; j++)
{
 // skip bins that are too far away from BMP's bin
 if (POSSIBLE_BMP_ARRAY[j].bin is more than 4 bins away from
 BMP's bin)
 {continue;}
 for (each peak above noise threshold in
  POSSIBLE_BMP_ARRAY[j].bin)
  {
   if (current peak is later than BEP || is more than
    GPS_EARLY_PEAK_POS_THRESH chips away earlier
than BMP) { continue; }
   if (current peak is below early_peak_eng_threshold)
   {
    break; // rest of peaks are also below threshold because peak list is
    sorted
   }
   if (current peak is equal to code phase of the BEP but is weaker)
   {continue;}
   if (jammer_ratio_test using current peak fails)
   {
    break; // bin is a jammer
   }
   // peak survived all the above tests!
   BEP = current peak;
  }
}
}
// BMP Selection Code
...
peak1 = BMP;
temp = j; // save index into POSSIBLE_BMP_ARRAY
// BEP selection code
...
peak2 = BEP;
// BOP selection code
if (BEP == BMP)
{ // this means no early path found
 BOP = null;
 for (j = temp; j < size of POSSIBLE_BMP_ARRAY; j++){
  if (BOP != null && first energy in bin < BOP.energy)
  {
   break; //exit bins loop
  }
  // not in a excluded bin
  if ((current bin < (BMP.bin − 1)) || (current bin > (BMP.bin + 1)))
  {
   // iterate through all peaks in bin, peaks are sorted
   for (each peak in POSSIBLE_BMP_ARRAY[j].bin)
   {
    // if true, all other peaks in bin lower energy
    if ((BOP != null) && (current_peak.energy < BOP.energy))
    {
     break; // exit peaks loop
    }
    if ((peak < (BMP.hyp − 1 hyps)) || (peak > (BMP.hyp + 1 hyps)) ||
     (peak < (BMP.bin − 4 bins)) || (peak > (BMP.bin + 4 bins)))
    {
     if (jammer_ratio_test for current bin passes) { BOP = peak;}
     break; //exit peaks loop
    }
   } // exit peak loop
  }
 } // exit bins loop
 peak2 = BOP;
}
```

Multiple Threshold Values

As mentioned in the Overview section above, device 102 may be adapted to utilize multiple different threshold values during a search. In this section, by way of example, a dual threshold technique for a tracking search is illustrated, which may be adapted for use in device 102.

For example, in certain implementations, logic may be provided such that processing unit 204 (FIG. 2) may employ multiple (e.g., dual) thresholds in tracking modes by comparing peaks found in an expected smaller region (e.g., subset of cells within a grid) using a lower threshold value while still allowing for increased sensitivity during the search. For example, in certain implementations, one region (e.g., inner) of a grid may be adapted to use the same PFA as another (e.g., outer) region of the grid, such that the sensitivity gain ranges from about 0.60 to about 0.74 dB, depending upon the integration length of the search. Additional sensitivity gain may be obtained, for example, by setting the grid PFA one order of magnitude higher for the inner region to provide for gain above 1 dB. The overall PFA may then be the sum of the PFAs for both inner and outer regions, such that if a peak is present the probability of a false alarm may be further reduced.

By way of example, logic may be adapted to apply lower noise and/or jammer threshold values (which may, e.g., be computed at runtime) to cells in the inner region of the grid. Dual thresholds such as this may be selectively enabled based, at least in part, on a level of confidence that a valid peak may be found in such a smaller region within the grid. For example, logic may be adapted to determine a level of certainty or uncertainty that a peak may be contained within a given region of the grid. Such logic may, for example, return time and frequency uncertainty as may be derived from either steering information and/or previous measurements (e.g., a source with the lower time uncertainty may be chosen).

With this in mind and by way of example but not limitation, in certain implementations a dual thresholding region may be provided which may include three time hypothesis by five frequency bins around a center bin. In certain exemplary implementations, the sensitivity gain from using a 3×3 region over the 3×5 region may be approximately 0.2 dB. For example, this may occur in certain stronger signal scenarios and/or in stationary scenarios with mild VCTCXO drift and/or user motion. In certain implementations, a larger region (e.g., 3×5 region) may be beneficial over a smaller region (e.g., a 3×3 region) if VCTCXO drift and/or user motion increases, which may allow a peak to drift in the frequency dimension. Thus, if a smaller region with more sensitivity gain were to be used such a peak may drift out of the smaller region, which may reduce the effectiveness of such dual thresholding techniques.

Figure 6A:
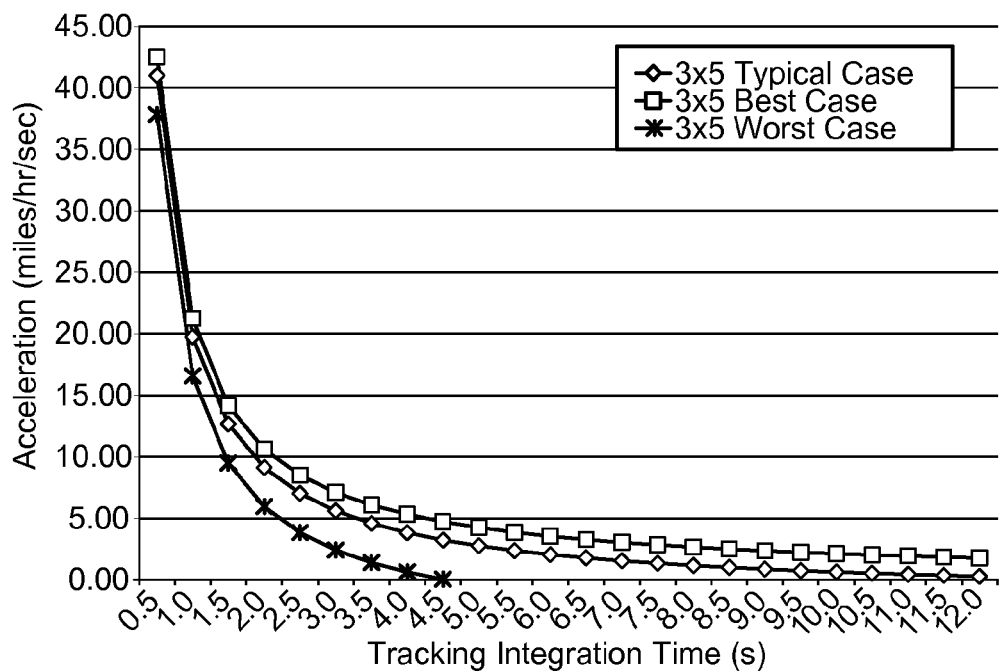
FIGS. 6A and 6B are graphs illustrating possible maximum user induced accelerations under a variety of scenarios.
Figure 6B:
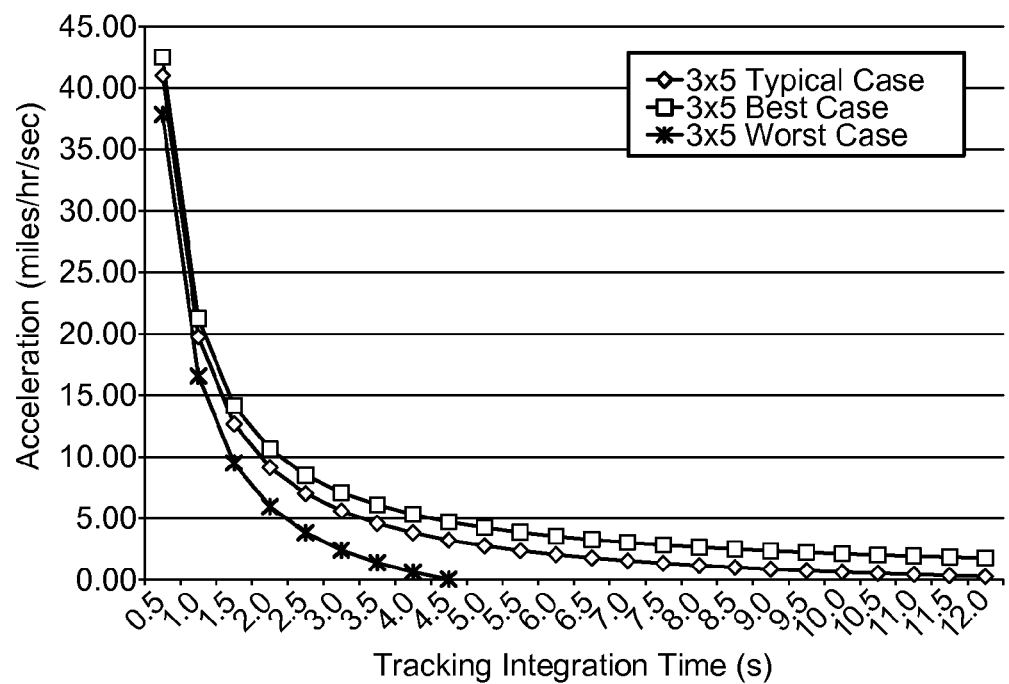

Regions larger than this exemplary size may not provide for appreciable sensitivity gain in certain devices. For example, the frequency width of such a dual thresholding region may act to effectively set a limit on a maximum frequency drift of the signal. Here, for example, some important design parameters may include the drift rate and/or the time between searches. If one assumes continuous tracking (e.g., having negligible delays between searches), then a time to the next search may be between about 0.5 to about 12 seconds. FIGS. 6A and 6B are exemplary graphs illustrating possible maximum user induced accelerations under a variety of scenarios. Here, for example, it may be seen that as the time between searches increases, dual thresholding techniques such as described herein may be more appropriate for use in certain scenarios (e.g., slower, stationary). These graphs show maximum user induced acceleration (in miles/hr/second) for some exemplary "typical", "best", and "worst" case scenarios of SV Doppler Rate+VCTCXO Drift. Here, e.g.: a typical scenario may have a 1 Hz/s SV Doppler rate and 2.5 Hz/sec LO drift at L1, a best scenario may have a 0 Hz/sec SV Doppler rate and 0 Hz/sec VCTCXO LO drift at L1, a worst scenario may have a 1 Hz/sec SV Doppler rate and 10 Hz/sec VCTCXO LO drift at L1.

Dynamic Integration Logic

As illustrated in the methods and apparatuses present in the Overview section above, device 102 may be adapted per dynamic integration logic to transition one or more searches in some manner. For example, device 102 may terminate or flag for termination a search if an applicable peak candidate has been identified, (e.g., a best earliest valid peak), as any additional integration beyond this point may not necessarily improve the quality of a measurement. Additionally, in certain forms, device 102 may have a limited power supply and hence terminating a search early may act to reduce power consumption.

To succeed with a search and conclude such early on, device 102 may be configured to be confident that an identified peak candidate is not related to a jammer, not related to cross-correlation, not related to a later path of the SPS signal, and/or the like.

Figure 7:
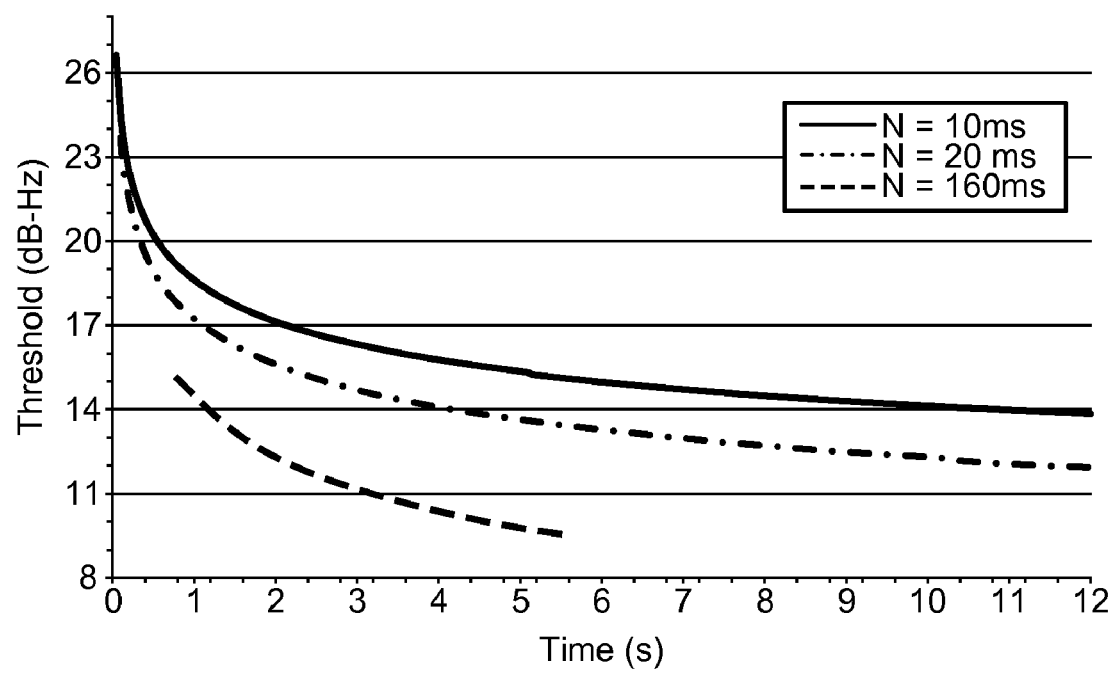
FIG. 7 is a graph illustrating a logarithmic drop off for three exemplary coherent integration times.

Integration time may be considered a fundamental parameter in a tradeoff between measurement/fix time and measurement quality. In addition, a longer integration time may tend to enable detection of earlier paths of the same signal (e.g., due to multipath reflections, etc) or a weaker signal in a presence of strong cross-correlation. As such, in certain implementations, one or more of the following design guidelines may be considered and/or otherwise implemented in the logic applied via processing unit 204 (FIG. 2):

(1) Doubling the integration time may drop the detection threshold by approximately 1.5 dB in certain implementations. For example, the graph in FIG. 7 shows a logarithmic drop off in a detection threshold (dB-Hz) (shown on y-axis) for three exemplary simulated coherent integration times (i.e., 10 ms, 20 ms and 160 ms) (e.g., for a grid PFA=$10^{-4}$) verses a total integration time (seconds) (shown on x-axis). Such exemplary drop off behavior may indicate that in certain situations to get approximately 3 dB above a noise threshold value, a search may have to integrate for approximately 4× the time.

(2) In additive white Gaussian noise (AWGN) interference, signal may be received from a single path but may be corrupted by AWGN, which may have a relatively flat frequency spectrum and/or Gaussian characteristics. The RMSE may, for example, include a measure of measurement error. A measurement quality may improve from approximately 20 m root mean square error (RMSE) at sensitivity to 10 m RMSE at 3 dB above sensitivity in certain implementations. However, in many signal environments, multipath may dominate and longer integration may not significantly improve measurement quality.

(3) Cross-correlations may be stronger than a true peak when a difference (e.g., delta) power between a stronger SV signal and a weaker SV signal may be more than a cross correlation loss. By way of example, for GPS L1/CA GNSS signals, such a loss may be (theoretically) a minimum of 21 dB though noise may cause values as low as about 13 dB at sensitivity. Thus, a scenario may occur in partially blocked environments for which cross-correlation peaks due to stronger SVs may indeed stronger than weaker true peaks.

(4) In certain implementations, it may be beneficial to transition from an acquisition search as soon as possible to enter a verification search, tracking search, and/or a combined verification/tracking search.

(5) In addition to verifying a potential peak, it may be useful in certain implementations for a verification search to consider weaker signals (e.g., earlier path of same signal, and/or other weaker signals in presence of significant cross correlation).

(6) If an acquisition search may not be followed by a verification search then it may be beneficial to also consider and search for weaker signals (e.g., earlier path of same signal, and/or other weaker signal in presence of significant cross correlation) in the acquisition search itself.

(7) In tracking, it may be beneficial to provide faster measurements to feed a navigation processor (e.g., implemented using a Kalman filter (not shown) or the like) within device 102 per a quicker interval to further improve a fix quality. In addition, device 102 may be adapted to track a known verified peak and as such may not necessarily need to check for weaker paths in every search. In fading environments, however, device 102 may be adapted to allow for detection of earlier paths during tracking searches, for example.

In certain implementations, the logic may be adapted such that cross-correlation checks may be performed on peaks per a sampling point (e.g. potentially at every 0.5 second in tracking, every 1 sec otherwise) prior to evaluating early success criteria.

In certain implementations, device 102 may be adapted to consider various statistics regarding a multi-path profile. For example, a maximum power variation in an exemplary GPS multipath profile may be $X_{track}$=6 dB and signals above $T_{no\_early\_path}$=33.5 dB-Hz may be assumed to be line of sight (LOS). Here, for example, signals above $T_{can't\ be\ autocorr}$ may not be related to autocorrelation/time side-lobe spurs. Considering certain characteristics of GPS L1C/A signals, for example, such threshold value may be set to about 31.75 dB-Hz to cover usage scenarios with active antennas with up to about 7 dB gain. In certain implementations, if it is found that peaks may be getting flagged as potential autocorrelations and/or time side-lobes too often (e.g., in field tests, etc.), then such a threshold value may be changed, e.g., reduced to about 27.25 dB-Hz. In certain implementations, the logic of device 102 may be adapted to detect one or more threshold values causes too many peaks to get flagged and to make appropriate changes to reduce such.

Dynamic integration peaks processing in device 102 may, for example, depend on the type of search that reported the peaks. For example, early success logic may be adapted to allow for an early transition to occur for certain types of acquisition, verification, and/or tracking searches. For example, in certain implementations acquisition searches may terminate only after a successful verification search. For example, in certain implementations the early success logic may be adapted to allow for an early success from a search after a specific time has passed.

Some exemplary pseudocode is provided below that may be adapted for use by device 102 for processing dynamic integration peaks, selecting the best candidate peak, and selecting the best of the multiple observations of the same candidate peak, if any. Exemplary pseudocode for individual functions for processing peaks from different types of dynamic integration searches is presented in subsequent sections. Note that peak1 here represents a primary valid peak that may be reported per SV dwell, peak2 represents a secondary valid weaker peak that may be reported per SV dwell for example, using dual peak reporting criteria as described in the examples above. Here again, those skilled in the art will recognize that such logic may be implemented in a variety of different ways.

```
early_success_allowed    =    !(single_shot_search)    &&
(srch_is_single_segment_acqusition || srch_is_verify ||
        srch_is_tracking);
void processDynamicIntegrationPeaks(Xtrack)
{
  /* Select best possible candidate for peak to be reported to PE, if any*/
  select_best_peak_candidate( );
  if (srch_is_single_shot) processSingleShotPeaks(Xtrack);
  else if (srch_is_multi_segment_acquisition)
                processMultiSegmentAcqisitionPeaks( );
  else if (early_success_allowed) processEarlySuccessPeaks(Xtrack);
}
void select_best_peak_candidate( ) {
 /* if a valid peak reported and it passes cross-corr test*/
 if (peak1_detected && (!is_peak_cross_corr(peak1)))
 {
/* select peak2 as candidate peak, if it passes cross-corr test and
 it is an earlier valid path of peak1; otherwise select peak1 */
 if (peak2_detected && (!is_peak_cross_corr(peak2)) &&
    ((peak1.cp - peak2.cp) < EARLY_PATH_THRESH_CHIPS) &&
    ((peak1.cno - peak2.cno) < EARLY_PATH_THRESH_DB) &&
      (abs(peak1.dopp - peak2.dopp) < EARLY_PATH_THRESH_Hz))
 {
     peak_candidate = peak2;
     peak_candidate.type = secondary;
     }
   else
   {
 peak_candidate = peak1;
 peak_candidate.type = primary;
     }
 }
 /* select peak2 as candidate peak of primary type if peak1 fails cross-corr
 test and peak2 passes cross-corr test*/
  else if (peak2_detected && (!is_peak_cross_corr(peak2))
  {
 peak_candidate = peak2;
 peak_candidate.type = primary;
 }
  /* otherwise, no candidate peak selected*/
  else
 {
 peak_candidate.type = none;
  }
}
```

In certain implementations it may be desirable to integrate long enough to determine with high confidence that a peak observed is indeed an earliest signal path (e.g., integrate until the signal is $X_{track}$ dB above a noise threshold value), however there may be situations wherein multiple observations are made of the same signal. As such, an exemplary function in the pseudocode below, is_old_peak_candidate_better( ), may be adapted to allow for storage of a copy of certain a search results, such as, e.g., may be associated with a primary peak that passes a cross-correlation check. For example, such a function may be adapted to mitigate certain issues associated with peak smearing in presence of large LO drift and/or during user motion in urban canyons. Thus, if a peak from the shorter search may be valid (e.g., passes a cross-correlation test) but may be just above the noise floor, then a longer integration may actually produce a worse measurement or otherwise may fail to find a peak in extreme cases. Consequently, such an exemplary function may be adapted to ensure that a better peak from a shorter search may be reported. For example, such a function may allow for a search to terminate if a peak from a longer search appears to be degrading. Once again those skilled in the art will recognize that such logic may be implemented in a variety of different ways.

```
boolean is_old_peak_candidate_better( ) {
  /* return true, if no candidate peak observed at this sampling point, but
     stored at any previous sampling point for this SV dwell */
  if (peak_candidate.type == none) {
       if (old_peak_candidate.type != none) { return TRUE; }
  /* if candidate peak type is primary, check if old candidate peak better */
  else if (peak_candidate.type == primary)
  {
     if (old_peak_candidate.type != none)
     {
     propagate stored candidate peak to time of new candidate peak;
       /* return TRUE if new & old candidate peaks are indeed the two
     observations of the same path, but new candidate peak is X dB weaker
     than old; otherwise store max of the two and return FALSE */
       if (abs(peak_candidate.cp - old_peak_candidate.cp) <
         SAME_PATH_CHIPS)
       {
         if (peak_candidate.cno < old_peak_candidate.cno - X)
         { return TRUE;}
         else if (peak_candidate.cno < old_peak_candidate.cno)
         {return FALSE;}
       }
     }
     /* otherwise store the new one, i.e. if candidate peak observed for
  the first time, or if old and new candidate peaks are not the observations
  of the same path*/
     old_peak_candidate = peak_candidate;
  }
  /* and return FALSE */
  return FALSE;
}
```

Note that the threshold "X" above may initially be set to a conservative value (e.g., 5 dB) to try to ensure noise in C/No estimator will not erroneously trigger this condition.

The following pseudocode presented functions may be adapted for use in device 102 to allow for a search of a peak that is not a cross-correlation and is either LOS (e.g., a signal that may be stronger than a "no-early-path" threshold) or a weaker earlier path of the same signal (e.g., device 102 may integrate until the signal is $X_{track}$ dB is above one or more threshold values (e.g., noise)), if any. Such functions may be applied in certain acquisition searches, verification searches, tracking searches, and/or combinations thereof. Here, for example, as a result of certain exemplary acquisition searches, autocorrelation/time side-lobe scan/verify searches may be initiated on peaks that pass a cross-correlation test. In addition, certain acquisition searches may be transitioned (e.g., terminated) only after successful verification.

Once a peak is observed in an acquisition search segment and a verification search scheduled, a segment may be transitioned without transitioning the rest of the acquisition search (e.g. the remaining acquisition search segments). Care should be taken in order to disable triggering unnecessary verifications on later observations of the same peak. The remaining acquisition search segments may, for example, be aborted or otherwise terminated once the verification search is successfully completed (either via early success or at max integration time).

In the exemplary pseudocode provided below, note that peak1 represents a primary valid peak; peak2 represents a secondary valid weaker peak. Also, note that this pseudocode assumes that a verify_allowed flag is initialized to TRUE, for example at the beginning of a GPS dwell. Those skilled in the art will recognize that such logic may be implemented in a variety of different ways.

```
verify_allowed = TRUE;
void processMultiSegmentAcquisitionPeaks( )
{
  /* if candidate peak is a multi-segment acquisition search peak, keep
     integrating; also, kickoff autocorrelation/time side-lobe scan/verify; */
  if ((peak_candidate.type != none) && verify_allowed)
  {
  if (peak_candidate.cno < Tcan't_be_an_auto_corr) // peak could be
  auttocorr perform autocorrelation/time side-lobe/time side-lobe scan before
  verify; schedule verify of peak_candidate;
  verify_allowed = FALSE;
  /* set verify_allowed to TRUE for next dwell */
  if (current_search_time == max_search_time) { verify_allowed = TRUE;}
  }
  void processEarlySuccessPeaks(Xtrack)
  {
  /* if search is single segment acquisition and best candidate peak is
     potentially a frequency side lobe, schedule verify and terminate
     the search */
  if ((peak_candidate.type != none) && verify_allowed &&
  (srch_is_single_segment_acquisition) && (peak_candidate.dopp in 3
  edge Doppler bins))
  {
  schedule verify;
  abort search;
  verify_allowed = FALSE;
  }
  /* if previous observation of the same peak better, terminate search and
     report old peak candidate*/
  else if (is_old_peak_candidate_better( ))
  {
  report old_peak_candidate;
  abort search;
  }
  /* if early success criteria satisfied or out of time, terminate search */
  else if ((peak_candidate.type == secondary) ||
     ((peak_candidate.type == primary) &&
     (peak_candidate.cno > MIN(Tno_early_path, noise_thresh +
     Xtrack))) || (current_search_time == max_search_time))
  {
  report peak_candidate;
  if (srch_is_tracking) { reset search; } else { abort search; }
  }
}
```

Here, for example, $X_{track}$ may be a variable input passed to these functions, e.g., to ensure that the logic searches for earlier paths in an intelligent fashion. In certain implementations, for example, $X_{track}$ may be established as follows: (1) $X_{track}$ may be set to 0 dB for an acquisition search if followed by a verification search, (2) $X_{track}$ may be set to =6 dB for a verification search, and/or for an acquisition search that is not followed by a verification search. For tracking searches that have lasted for at least two seconds, $X_{track}$ may be set to 0 dB. For tracking searches that are less than about two seconds, $X_{track}$ may be greater than 0 dB (e.g., 3 dB, 6 dB, etc.).

For tracking searches, $X_{track}$ may be set to 3 dB or 6 dB (instead of 0 dB) for the current search if the prior search result was an early path (peak type was secondary). Such a prior search may have been an acquisition and/or verification search conducted prior to entering tracking or the previous tracking result. $X_{track}$ may be set to 6 dB every $Z^{th}$ tracking searches even if the prior peak type is primary to allow for periodic checks for early paths. Here, for example the variable Z may be set to ten, or a less or greater integer. In certain implementations, the logic may stagger SVs when setting $X_{track}$ to 6 dB (e.g. set it to 6 dB for one SV at the time), to possibly ensure that a Kalman Filter (not shown) or the like within device 102 may not experience a sudden drop in all incoming measurements.

In certain implementations, early success search termination may not be allowed, but early exit might (e.g. single shot searches). In addition to evaluating the early exit criteria at the first sampling point/at the end of the first dwell for all searches, dynamic early exit criteria may be adapted to allow for evaluation of subsequent intermediate sampling points (e.g., every sec). Only those SVs that are satisfying early success criteria (e.g., a valid peak is not associated with a cross-correlation and is either LOS or a weaker earlier path of the same signal) may be flagged for consideration for dynamic early exit. In certain implementations, for example, it may be useful for all SVs with valid measurements to be reported when a search is transitioned (e.g., terminated) regardless of the early exit criteria being satisfied or not for that SV. By way of example, but not limitation exemplary pseudocode is provided below.

```
// initialize flags to FALSE
oldPeakWasBetter = FALSE;
considerSVforEarlyExit = FALSE;
void processSingleShotPeaks(Xtrack)
{
  /* if previous observation of the same peak is better, maintain old peak.
     this code is only entered if a valid measurement has been reported
     previously. */
if (is_old_peak_candidate_better( ))
{
peak_candidate = old_peak_candidate;
oldPeakWasBetter = TRUE;
return;
}
/* if early success criteria satisfied or out of time, mark meas as ready */
if ((peak_candidate.type == secondary) ||
    ((peak_candidate.type == primary) &&
(peak_candidate.cno > MIN(Tno_early_path, noise_thresh + Xtrack)))
{
considerSVforEarlyExit = TRUE;
oldPeakWasBetter = FALSE;
return;
}
considerSVforEarlyExit = FALSE;
}
```

Note that $X_{track}$ for certain searches (e.g., single shot searches) may be set to 6 dB only after a first sniff/sampling point in an early success search.

In certain implementations it may be beneficial to decouple the search integration time from a measurement rate. For example, the logic applied via processing unit 204 (FIG. 2) may be adapted to allow integration of searches to continue until either an early peak is detected or maximum integration time is reached while reporting intermediate valid peaks. For example, energy measurement(s) surrounding (e.g., adjacent and/or near-by) an intermediate peak may be saved and subtracted from subsequent cells/regions/grids to provide uncorrelated measurement values while still benefiting from the early path detection capability of searches (e.g., longer searches). Such a technique may improve both the time to first fix (TTFF) and/or the tracking mode measurement rate in certain implementations. Note that if an earlier peak is found, it may be weighted heavily and/or flagged in some manner as a correction for an earlier measurement to ensure, for example, that a Kalman Filter recovers.

In certain implementations it may be beneficial to adapt the early success logic to implement a pre-emptive cross-correlation test, for example, wherein knowledge of other SVs and therefore cross-correlation check may be incorporated in the peak processing functionality of device 102. In this manner, for example, a probability of reporting weaker valid signal in presence of strong cross-correlation may be increased and/or maximized and the early success logic may be simplified to consider only one peak per SV dwell.

Dynamic Threshold Values

In certain example implementations, methods may be provided which dynamically or otherwise determine one or more threshold values for any or certain combinations of search parameters such that a receiver may effectively execute a search with parameters and threshold values that may be more appropriate for a given environment.

By way of example but not limitation, device 102 may be adapted to dynamically establish certain threshold values, such as, noise and/or jammer threshold values. Further, certain specific mode parameter values that may result from the grid processing frequency and/or certain sensitivity values corresponding to certain intervals (e.g., as may be found by simulation) may be established or otherwise provided.

Noise threshold values may, for example, be established dynamically or otherwise by numerically approximating a 1-$PFA_{cell}$ point on a chi-squared CDF (with 2M degrees of freedom) and scaling by the noise power. For example, in certain implementations, such a threshold value may be determined using a quadratic fit as a function of M (non-coherent integrations), while the quadratic coefficients themselves may, for example, be determined by linearly interpolating in small LUTs that may be stored in memory. Such noise threshold values may be determined or otherwise applied by device 102, for example using an automatic noise thresholding algorithm for various mode parameters and M values that may correspond to grid-processing intervals (e.g., device 102 may be adapted to process energy grids at a 2 Hz or 1 Hz rate).

Jammer threshold values may, for example, be established dynamically or otherwise by numerically approximating a point on the SNR CDF of signals at sensitivity. Such values may, for example, be determined by quadratic and linear interpolation that may be implemented in an automatic jammer thresholding algorithm adapted for use in device 102. For example, such automatic jammer thresholding algorithm may be adapted for various mode parameters and M values that may correspond to grid-processing intervals (e.g., device 102 may be adapted to process energy grids at a 2 Hz or 1 Hz rate).

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

The invention claimed is:

1. A method comprising:

as part of at least one search for a transmission from a space vehicle (SV), correlating a code associated with said SV with a received signal to establish a plurality of correlation values;

sampling at least a portion of said correlation values during said search; and selectively transitioning said search early or prematurely based, at least in part, on at least one of said sampled correlation values, wherein selectively transitioning said search further comprises identifying said at least one of said sampled correlation values as a peak candidate associated with said transmission from said SV, and subtracting at least one energy measurement surrounding at least one peak candidate from subsequent cells, regions, and/or grids to provide at least one uncorrelated measurement value.

2. The method as recited in claim 1, further comprising determining that said at least one of said sampled correlation values represents a peak candidate associated with said transmission from said SV based, at least in part, on at least one peak threshold value.

3. A method comprising:
as part of at least one search for a transmission from a space vehicle (SV), correlating a code associated with said SV with a received signal to establish a plurality of correlation values, wherein said at least one search comprises an acquisition search;
sampling at least a portion of said correlation values during said search;
selectively transitioning said search early or prematurely based, at least in part, on at least, one of said sampled correlation values, and
in response to selectively transitioning said search, initiating a verification search based, at least in part, on at least one of said sampled correlation values.

4. A method comprising:
as part of at least one search for a transmission from a space vehicle (SV), correlating a code associated with said SV with a received signal to establish a plurality of correlation values, wherein said at least one search comprises an acquisition search or a verification search or both;
sampling at least a portion of said correlation values during said search;
selectively transitioning said search early or prematurely based, at least in part, on at least one of said sampled correlation values, and
in response to selectively transitioning said search, initiating a tracking search based, at least in part, on at least one of said sampled correlation values.

5. A method comprising:
as part of at least one search for a transmission from a space vehicle (SV), correlating a code associated with said SV with a received signal to establish a plurality of correlation values;
sampling at least a portion of said correlation values during said search;
selectively transitioning said search early or prematurely based, at least in part, on at least one of said sampled correlation values; and
determining that said at least one of said sampled correlation values represents a peak candidate associated with said transmission from said SV based, at least in part, on at least one peak threshold value, wherein said peak threshold value is equal to or greater than at least one threshold value selected from the group consisting of: a noise threshold value and a jammer threshold value.

6. The method as recited in claim 5, wherein sampling at least said portion of said correlation values during said search comprises identifying at least one intermediate valid peak as a peak candidate during said search until an early peak is detected and/or a maximum integration time is reached.

7. The method as recited in claim 6, wherein identifying said at least one intermediate valid peak during said search comprises subtracting at least one energy measurement surrounding at least one intermediate peak from subsequent cells, regions, and/or grids to provide at least one uncorrelated measurement value.

8. The method as recited in claim 6, wherein identifying said at least one intermediate valid peak during said search comprises identifying a correction for an earlier correlation value if an earlier peak is identified.

9. The method as recited in claim 5, wherein selectively transitioning said search early or prematurely comprises operatively decoupling a search integration time from a measurement rate.

10. The method as recited in claim 5, wherein selectively transitioning said search based, at least in part, on said at least one of said sampled correlation values comprises identifying said at least one of said sampled correlation values as a peak candidate associated with said transmission from said SV.

11. The method as recited in claim 5, wherein selectively transitioning said search based, at least in part, on at least one of said sampled correlation values comprises selectively transitioning said search based, at least in part, on at least two of said sampled correlation values and identifying each of said at least two of said sample correlation values as peak candidates associated with said transmission from said SV.

12. The method as recited in claim 11, wherein a first one of said at least two of said sampled correlation values is identified as a best max peak (BMP) candidate and a second one of said at least two of said sampled correlation values is identified as a best early peak (BEP) candidate or a best other peak (BOP) candidate.

13. The method as recited in claim 5, wherein selectively transitioning said search based, at least in part, on at least one of said sampled correlation values comprises at least identifying said at least one search as being ready for termination.

14. The method as recited in claim 5, wherein selectively transitioning said search based, at least in part, on at least one of said sampled correlation values comprises terminating or resetting said search.

15. The method as recited in claim 5, wherein selectively transitioning said search based, at least in part, on at least one of said sampled correlation values comprises initiating at least one other type of search.

16. The method as recited in claim 5, wherein correlating said code for said SV with said received signal comprises establishing said correlation values associated with a range of code phase hypotheses and a range of Doppler frequency hypotheses.

17. The method as recited in claim 5, wherein sampling at least said portion of said integrated correlation values during said search comprises periodically sampling at least said portion of said integrated correlation values during said search.

18. The method as recited in claim 5, further comprising selectively adapting said at least one peak threshold value based, at least on part, on at least one correlation value associated with a previous search.

19. The method as recited in claim 5, further comprising selectively adapting said at least one peak threshold value based, at least on part, on at least one previously sampled correlation value.

20. The method as recited in claim 5, wherein said peak threshold value is based, at least in part, on a type of said at least one search.

21. The method as recited in claim 5, further comprising dynamically establishing said at least one peak threshold value based, at least on part, on at least one correlation value associated with a previous search.

22. The method as recited in claim 5, wherein selectively prematurely transitioning said search based, at least in part, on said at least one of said sampled correlation values comprises comparing said at least one of said sampled correlation values with at least one corresponding previously sampled correlation value.

23. The method as recited in claim 5, further comprising establishing at two different noise threshold values or at least two different jammer threshold values for at least two of said correlation values.

24. The method as recited in claim 23, further comprising establishing at least one of a reduced noise threshold value or a reduced jammer threshold value for a subset of cells within a virtual grid region based, at least on part, on at least one of said sampled correlation values.

25. The method as recited in claim 23, further comprising establishing at least one of a reduced noise threshold value or a reduced jammer threshold value for a subset of cells within a virtual grid region based, at least on part, on at least one of correlation value associated with a previous search.

26. The method as recited in claim 5, wherein selectively transitioning said at least one search further comprises at least one of:
terminating said at least one search;
resetting said at least one search;
flagging said at least one search as ready for termination;
transitioning said at least one search from a first type of search to a second type of search; or
extending said at least one search.

27. A method comprising:
as part of at least one search for a transmission from a space vehicle (SV), correlating a code associated with said SV with a received signal to establish a plurality of correlation values;
sampling at least a portion of said correlation values during said search;
selectively transitioning said search early or prematurely based, at least in part, on at least one of said sampled correlation values; and
determining that said at least one of said sampled correlation values represents a peak candidate associated with said transmission from said SV based, at least in part, on at least one peak threshold value, wherein said peak threshold value is based, at least in part, on at least one pad value and at least one threshold value selected from the group consisting of: a noise threshold value and a jammer threshold value.

28. The method as recited in claim 27, wherein said pad value is based, at least in part, on a type of said at least one search.

29. The method as recited in claim 27, wherein said at least one search comprises an acquisition search with a subsequent verification search and said pad value comprises a lower pad value.

30. The method as recited in claim 27, wherein said at least one search comprises an acquisition search without a subsequent verification search and said pad value comprises a higher pad value.

31. The method as recited in claim 27, wherein said at least one search comprises a verification search and said pad value comprises a higher pad value.

32. The method as recited in claim 27, wherein said at least one search comprises a tracking search and said pad value comprises a higher pad value provided a search time associated with said tracking search has not exceeded a time threshold.

33. The method as recited in claim 27, wherein said at least one search comprises a tracking search and said pad value comprises a lower pad value provided a search time associated with said tracking search has exceeded a time threshold.

34. The method as recited in claim 27, wherein said at least one search comprises a tracking search associated with at least one earlier selectively terminated search at said pad value comprises a higher pad value.

35. The method as recited in claim 27, wherein said at least one search comprises a tracking search associated with at least one earlier tracking search and said pad value is changed at least once from at least a lower pad value and a higher pad value.

36. The method as recited in claim 27, wherein said pad value comprises at least one of a lower pad value that is 0 dB or a higher pad value is greater than 0 dB.

37. A method comprising:
as part of at least one search for a transmission from a space vehicle (SV), correlating a code associated with said SV with a received signal to establish a plurality of correlation values;
sampling at least a portion of said correlation values during said search;
selectively transitioning said search early or prematurely based, at least in part, on at least one of said sampled correlation values;
determining that said at least one of said sampled correlation values represents a peak candidate associated with said transmission from said SV based, at least in part, on at least one peak threshold value, and
wherein selectively prematurely transitioning said search based, at least in part, on said at least one of said sampled correlation values comprises comparing said at least one of said sampled correlation values with at least one corresponding previously sampled correlation value using at least a portion of a cross-correlation test.

38. A method comprising:
as part of at least one search for a transmission from a space vehicle (SV), correlating a code associated with said SV with a received signal to establish a plurality of correlation values;
sampling at least a portion of said correlation values during said search;
selectively transitioning said search early or prematurely based, at least in part, on at least one of said sampled correlation values;
determining that said at least one of said sampled correlation values represents a peak candidate associated with said transmission from said SV based, at least in part, on at least one peak threshold value, and
wherein selectively prematurely transitioning said search based, at least in part, on said at least one of said sampled correlation values comprises comparing said at least one of said sampled correlation values with at least one corresponding previously sampled correlation value and determining that said at least one corresponding previously sampled correlation value is a peak candidate associated with said transmission from said SV based, at least in part, on said at least one corresponding previously sampled correlation value being greater than said at least one of said sampled correlation values.

39. An apparatus comprising:
at least one front-end radio adapted to receive a transmission from a space vehicle (SV) and generate a corresponding digital signal based thereon; and
at least one processing unit to: access said digital signal as part of at least one search for said transmission from said SV, correlate a code for said SV with a received signal to establish a plurality of correlation values, sample at least a portion of said correlation values during said search, and selectively transition said search based, at least in part, on at least one of said sampled correlation values, identify said at least one of said sampled correlation values as a peak candidate associated with said transmission from said SV, and subtract at least one energy measurement surrounding at least one peak candidate from subsequent cells, regions, and/or grids to provide at least one uncorrelated measurement value.

40. An apparatus comprising:
at least one front-end radio adapted to receive a transmission from a space vehicle (SV) and generate a corresponding digital signal based thereon; and
at least one processing unit to: access said digital signal as part of at least one search for said transmission from said SV, correlate a code for said SV with a received signal to establish a plurality of correlation values, sample at least a portion of said correlation values during said search, wherein said at least one search comprises an acquisition search and said at least one processing unit to further selectively transition said search by initiating a verification search based, at least in part, on at least one of said sampled correlation values.

41. The apparatus as recited in claim 40, said at least one processing unit to further identify at least one intermediate valid peak as a peak candidate during said search until an early peak is detected and/or a maximum integration time is reached.

42. The apparatus as recited in claim 41, said at least one processing unit to further subtract at least one energy measurement surrounding at least one intermediate peak from subsequent cells, regions, and/or grids to provide at least one uncorrelated measurement value.

43. The apparatus as recited in claim 41, said at least one processing unit to further identify a correction for an earlier correlation value if an earlier peak is identified.

44. The apparatus as recited in claim 40, said at least one processing unit to further operatively decouple a search integration time from a measurement rate.

45. The apparatus as recited in claim 40, said at least one processing unit to further identify said at least one of said sampled correlation values as a peak candidate associated with said transmission from said SV.

46. The apparatus as recited in claim 40, said at least one processing unit to further:
selectively transition said search based, at least in part, on at least two of said sampled correlation values, and
identify each of said at least two of said sample correlation values as peak candidates associated with said transmission from said SV.

47. The apparatus as recited in claim 46, wherein a first one of said at least two of said sampled correlation values is identified as a best max peak (BMP) candidate and a second one of said at least two of said sampled correlation values is identified as a best early peak (BEP) candidate or a best other peak (BOP) candidate.

48. The apparatus as recited in claim 40, said at least one processing unit to further selectively transition said at least one search by at least identifying said at least one search as being ready for termination.

49. The apparatus as recited in claim 40, said at least one processing unit to further selectively transition said search based, at least in part, on at least one of said sampled correlation values comprises terminating or resetting said search.

50. The apparatus as recited in claim 40, said at least one processing unit to further selectively transition said search based, at least in part, on at least one of said sampled correlation values comprises initiating at least one other type of search.

51. The apparatus as recited in claim 40, said at east one processing unit to further determine that said at least one of said sampled correlation values represents a peak candidate associated with said transmission from said SV based, at least in part, on at least one peak threshold value.

52. The apparatus as recited in claim 51, said at least one processing unit to further selectively adapt said at least one peak threshold value based, at least on part, on at least one correlation value associated with a previous search.

53. The apparatus as recited in claim 51, said at least one processing unit to further selectively adapt said at least one peak threshold value based, at least on part, on at least one previously sampled correlation value.

54. The apparatus as recited in claim 40, said at least one processing unit to further compare said at least one of said sampled correlation values with at least one corresponding previously sampled correlation value.

55. The apparatus as recited in claim 40, said at least one processing unit to further establish at two different noise threshold values or at least two different jammer threshold values for at least two of said correlation values.

56. The apparatus as recited in claim 55, said at least one processing unit to further establish at least one threshold value selected from the group consisting of a reduced noise threshold value and a reduced jammer threshold value for a subset of cells within a virtual grid region based, at least on part, on at least one of said sampled correlation values.

57. The apparatus as recited in claim 55, said at least one processing unit to further establish at least one threshold value selected from the group consisting of a reduced noise threshold value and a reduced jammer threshold value for a subset of cells within a virtual grid region based, at least on part, on at least one of correlation value associated with a previous search.

58. The apparatus as recited in claim 40, said at least one processing unit to further selectively transition said at least one search by initiating at least one of:
terminating said at least one search;
resetting said at least one search;
flagging said at least one search as ready for termination;
transitioning said at least one search from a first type of search to a second type of search; or
extending said at least one search.

59. An apparatus comprising:
at least one front-end radio adapted to receive a transmission from a space vehicle (SV) and generate a corresponding digital signal based thereon; and
at least one processing unit to: access said digital signal as part of at least one search for said transmission from said SV, correlate a code for said SV with a received signal to establish a plurality of correlation values, sample at least a portion of said correlation values during said search, wherein said at least one search comprises an acquisition search or a verification search or both, and said at least one processing unit to further selectively transition said search by initiating a tracking search based, at least in part, on at least one of said sampled correlation values.

60. An apparatus comprising:
at least one front-end radio adapted to receive a transmission from a space vehicle (SV) and generate a corresponding digital signal based thereon; and
at least one processing unit to: access said digital signal as part of at least one search for said transmission from said SV, correlate a code for said SV with a received signal to establish a plurality of correlation values, sample at least a portion of said correlation values during said search, and selectively transition said search based, at least in part, on at least one of said sampled correlation values, and determine that said at least one of said sampled correlation values represents a peak candidate associated with said transmission from said SV based, at least in part, on at least one peak threshold value, wherein said peak threshold value is based, at least in part, on at least one pad value and at least one threshold value selected from the group consisting of a noise threshold value and a jammer threshold value.

61. The apparatus as recited in claim 60, wherein said pad value is based, at least in part, on a type of said at least one search.

62. The apparatus as recited in claim 60, wherein if:
said at least one search comprises an acquisition search with a subsequent verification search, said pad value comprises a lower pad value;
said at least one search comprises an acquisition search without a subsequent verification search, said pad value comprises a higher pad value;
said at least one search comprises a verification search, said pad value comprises a higher pad value;
said at least one search comprises a tracking search, said pad value comprises a higher pad value provided a search time associated with said tracking search has not exceeded a time threshold;
said at least one search comprises a tracking search, said pad value comprises a lower pad value provided said search time associated with said tracking search has exceeded said time threshold;
said at least one search comprises a tracking search associated with at least one earlier selectively terminated search, said pad value comprises a higher pad value; and/or
said at least one search comprises a tracking search associated with at least one earlier tracking search, said pad value is changed at least once from at least a lower pad value and a higher pad value.

63. The apparatus as recited in claim 60, wherein said pad value comprises at least one of a lower pad value that is 0 dB or a higher pad value is greater than 0 dB.

64. An article comprising:
a computer readable medium having computer implementable instructions stored thereon that are executable by at least one processing unit to:
as part of at least one search for a transmission from a space vehicle (SV), correlate a code for said SV with a received signal to establish a plurality of correlation values;
sample at least a portion of said correlation values during said search;
selectively transition said search based, at least in part, on at least one of said sampled correlation values; and
subtract at least one energy measurement surrounding at least peak candidate from subsequent cells, regions, and/or grids to provide at least one uncorrelated measurement value.

65. An article comprising:
a computer readable medium having computer implementable instructions stored thereon that are executable by at least one processing unit to:
as part of at least one search for a transmission from a space vehicle (SV), correlate a code for said SV with a received signal to establish a plurality of correlation values, wherein said at least one search comprises an acquisition search;
sample at least a portion of said correlation values during said search; and
selectively transition said search based, at least in part, on at least one of said sampled elation values, and by initiating a verification search based, at least in part, on said at least one of said sampled correlation values.

66. The article as recited in claim 65, comprising further computer implementable instructions that are executable by said at least one processing unit to identify at least one intermediate valid peak as a peak candidate during said search until an early peak is detected and/or a maximum integration time is reached.

67. The article as recited in claim 66, comprising further computer implementable instructions that are executable by said at least one processing unit to subtract at least one energy measurement surrounding at least one intermediate peak from subsequent cells, regions, and/or grids to provide at least one uncorrelated measurement value.

68. The article as recited in claim 66, comprising further computer implementable instructions that are executable by said at least one processing unit to identify a correction for an earlier correlation value if an earlier peak is identified.

69. The article as recited in claim 65, comprising further computer implementable instructions that are executable by said at least one processing unit to operatively decouple a search integration time from a measurement rate.

70. The article as recited in claim 65, comprising further computer implementable instructions that are executable by said at least one processing unit to identify said at least one of said sampled correlation values as a peak candidate associated with said transmission from said SV.

71. The article as recited in claim 65, comprising further computer implementable instructions that are executable by said at least one processing unit to:
selectively transition said search based, at least in part, on at least two of said sampled correlation values, and
identify each of said at least two of said sample correlation values as peak candidates associated with said transmission from said SV.

72. The article as recited in claim 71, wherein a first one of said at least two of said sampled correlation values is identified as a best max peak (BMP) candidate and a second one of said at least two of said sampled correlation values is identified as a best early peak (BEP) candidate or a best other peak (BOP) candidate.

73. The article as recited claim 65, comprising further computer implementable instructions that are executable by said at least one processing unit to selectively transition said at least one search by at least identifying said at least one search as being ready for termination.

74. The article as recited in claim 65, comprising further computer implementable instructions that are executable by said at least one processing unit to selectively transition said search based, at least in part, on at least one of said sampled correlation values comprises terminating or resetting said search.

75. The article as recited in claim 65, comprising further computer implementable instructions that are executable by said at least one processing unit to selectively transition said search based, at least in part, on at least one of said sampled correlation values comprises initiating at least one other type of search.

76. The article as recited in claim 65, comprising further computer implementable instructions that are executable by said at least one processing unit to determine that said at least one of said sampled correlation values represents a peak candidate associated with said transmission from said SV based, at least in part, on at least one peak threshold value.

77. The article as recited in claim 76, comprising further computer implementable instructions that are executable by said at least one processing unit to selectively adapt said at least one peak threshold value based, at least on part, on at least one correlation value associated with a previous search.

78. The article as recited in claim 76, comprising further computer implementable instructions that are executable by said at least one processing unit to selectively adapt said at least one peak threshold value based, at least on part, on at least one previously sampled correlation value.

79. The article as recited in claim 65, comprising further computer implementable instructions that are executable by said at least one processing unit to compare said at least one of said sampled correlation values with at least one corresponding previously sampled correlation value.

80. The article as recited in claim 65, comprising further computer implementable instructions that are executable by said at least one processing unit to establish at two different noise threshold values or at least two different jammer threshold values for at least two of said correlation values.

81. The article as recited in claim 80, comprising further computer implementable instructions that are executable by said at least one processing unit to establish a reduced noise threshold value or a reduced jammer threshold value or both for a subset of cells within a virtual grid region based, at least on part, on at least one of said sampled correlation values.

82. The article as recited in claim 80, comprising further computer implementable instructions that are executable by said at least one processing unit to establish a reduced noise threshold value or a reduced jammer threshold value or both for a subset of cells within a virtual grid region based, at least on part, on at least one of correlation value associated with a previous search.

83. The article as recited in claim 65, comprising further computer implementable instructions that are executable by said at least one processing unit selectively transition said at least one search by initiating at least one of:
terminating said at least one search;
resetting said at least one search;
flagging said at least one search as ready for termination;
transitioning said at least one search from a first type of search to a second type of search; or
extending said at least one search.

84. An article comprising:
a computer readable medium having computer implementable instructions stored thereon that are executable by at least one processing unit to:
as part of at least one search for a transmission from a space vehicle (SV), correlate a code for said SV with a received signal to establish a plurality of correlation values, wherein said at least one search comprises an acquisition search or a verification search or both;
sample at least a portion of said correlation values during said search; and
selectively transition said search based, at least in part, on at least one of said sampled correlation values, and by initiating a tracking search based, at least in part, on said at least one of said sampled correlation values.

85. An article comprising:
a computer readable medium having computer implementable instructions stored thereon that are executable by at least one processing unit to:
as part of at least one search for a transmission from a space vehicle (SV), correlate a code for said SV with a received signal to establish a plurality of correlation values;
sample at least a portion said correlation values during said search; selectively transition said search based, at least in part, on at least one of said sampled correlation values; and
determine that said at least one of said sampled correlation values represents a peak candidate associated with said transmission from said SV based, at least in part, on at least one peak threshold value, wherein said peak threshold value is based, at least in part, on at least one pad value and at least one threshold value selected from the group consisting of: a noise threshold value and a jammer threshold value.

86. The article as recited in claim 85, wherein said pad value is based, at least in part, on a type of said at least one search.

87. The article as recited in claim 85, wherein if:
said at least one search comprises an acquisition search with a subsequent verification search, said pad value comprises a lower pad value;
said at least one search comprises an acquisition search without a subsequent verification search, said pad value comprises a higher pad value;
said at least one search comprises a verification search, said pad value comprises a higher pad value;
said at least one search comprises a tracking search, said pad value comprises a higher pad value provided a search time associated with said tracking search has not exceeded a time threshold;
said at least one search comprises a tracking search, said pad value comprises a lower pad value provided said search time associated with said tracking search has exceeded said time threshold;
said at least one search comprises a tracking search associated with at least one earlier selectively terminated search, said pad value comprises a higher pad value; and/or
said at least one search comprises a tracking search associated with at least one earlier tracking search, said pad value is changed at least once from at least a lower pad value and a higher pad value.

88. The article as recited in claim 85, wherein said pad value comprises at least one of a lower pad value that is 0 dB or a higher pad value is greater than 0 dB.

89. A mobile device comprising:
means for correlating a code for a space vehicle (SV) with a received signal to establish a plurality of correlation values as part of at least one search for a transmission from said SV;
means for sampling at least a portion of said correlation values during said search;
means for selectively transitioning said search based, at least in part, on at least one of said sampled correlation values; and
means for subtracting at least one energy measurement surrounding at least peak candidate from subsequent cells, regions, and/or grids to provide at least one uncorrelated measurement value.

90. A mobile device comprising:
means for correlating a code for a space vehicle (SV) with a received signal to establish a plurality of correlation values as part of at least one search for a transmission from said SV, wherein said at least one search comprises an acquisition search;
means for sampling at least a portion of said correlation values during said search; and
means for selectively transitioning said search based, at east in part, on at least one of said sampled correlation values, and by initiating a verification search based, at least in part, on said at least one of said sampled correlation values.

91. A mobile device comprising:

means for correlating a code for a space vehicle (SV) with a received signal to establish a plurality of correlation values as part of at least one search for a transmission from said SV, wherein said at least one search comprises an acquisition search or a verification search or both;

means for sampling at least a portion of said correlation values during said search; and means for selectively transitioning said search based, at least in part, on at least one of said sampled correlation values, and by initiating a tracking search based, at least in part, on said at least one of said sampled correlation values.

92. A mobile device comprising:

means for correlating a code for a space vehicle (SV) with a received signal to establish a plurality of correlation values as part of at least one search for a transmission from said SV;

means for sampling at least a portion of said correlation values during said search;

means for selectively transitioning said search based, at least in part, on at least one of said sampled correlation values; and means for determining that said at least one of said sampled correlation values represents a peak candidate associated with said transmission from said SV based, at least in part, on at least one peak threshold value, wherein said peak threshold value is based, at least in part, on at least one pad value and at least one threshold value selected from the group consisting of a noise threshold value and a jammer threshold value.

* * * * *